United States Patent [19]

Conwicke

[11] 3,801,337
[45] Apr. 2, 1974

[54] SINTERING AIDS FOR PRODUCING ALUMINA DIELECTRIC COMPOSITIONS COFIREABLE WITH PALLADIUM

[75] Inventor: Joel Alfred Conwicke, Wilmington, Del.

[73] Assignee: E. I. du Pont de Nemours and Company, Wilmington, Del.

[22] Filed: Oct. 16, 1972

[21] Appl. No.: 297,733

Related U.S. Application Data

[62] Division of Ser. No. 101,166, Dec. 23, 1970, abandoned.

[52] U.S. Cl. .............................. 106/73.4, 252/508
[51] Int. Cl. ........................ C04b 33/26, H01b 3/12
[58] Field of Search ............... 106/73.4, 53, 46, 49; 317/258; 252/508

[56] References Cited
UNITED STATES PATENTS

| 2,887,394 | 5/1959 | Bickford | 106/46 |
| 2,956,219 | 10/1960 | Cianch | 317/258 |
| 3,019,116 | 1/1962 | Doucette | 106/73.4 |
| 3,277,354 | 10/1966 | Ikeda et al. | 106/53 |
| 3,558,332 | 1/1971 | Bachaman | 106/73.4 |
| 3,586,522 | 6/1971 | Hoffman | 106/39.6 |
| 3,673,092 | 6/1972 | Dietz | 106/73.3 |

*Primary Examiner*—A. B. Curtis
*Assistant Examiner*—Mark Bell

[57] ABSTRACT

Sintering aids for producing dielectric compositions of alumina which may be sintered at or below 1,500°C. and, hence, may be cofired with palladium metallizations. These sintering aids are glass frits made from certain critical combinations of oxides. Also dielectric compositions of 75–97 percent alumina and 3–25 percent sintering aid, and articles comprising ceramic dielectric substrates made from those dielectric compositions.

11 Claims, No Drawings

SINTERING AIDS FOR PRODUCING ALUMINA DIELECTRIC COMPOSITIONS COFIREABLE WITH PALLADIUM

This is a division of application Ser. No. 101,166, filed Dec. 23, 1970.

BACKGROUND OF THE INVENTION

This invention relates to ceramic substrates for electronic circuitry and, more particularly, to alumina substrates with low dielectric constants.

Ceramic dielectric substrates having a high alumina content are used extensively in the electronics industry as the support for hybrid microelectronic circuitry. Such high alumina ceramics, commonly above 90 percent alumina, are chosen due to mechanical strength and thermal conductivity, as well as their dielectric character. Such substrates are commonly made by a "tape" process, whereby a flexible sheet is made by dispersing alumina in a suitable binder/solvent system, depositing the same on a support, doctor blading the slurry, drying it, and then stripping the alumina tape from the support. The tape is then cut or punched to size. Depending on composition, the cut pieces are fired in an inert, reducing or oxiding atmosphere at elevated temperature, generally 1,650°C., to densify the ceramic to near-theoretical density; porosity must be kept below 8 percent to ensure acceptable properties.

Multilayer ceramic substrates with buried conductor metallizations are employed to achieve maximum integrated circuit density in hermetic electronic packages. High alumina compositions which must be air fired at 1,650°C. require the use of platinum as buried conductors, since less noble or refractory metals either melt or oxidize, resulting in destruction of electrical continuity. Considerable economic advantages can be gained by using palladium metallizations. However, the melting point of palladium (1,550°C.) requires a dielectric tape composition which densifies below 1,550°C., preferably at or below 1,500°C. Furthermore, the availability of ceramic densifying at or below 1,500°C. would simplify processing and reduce costs.

Exemplary of art regarding sintering of alumina is the literature cited in Chapter 16, entitled "Sintering," appearing in the American Ceramic Society's "Alumina as a Ceramic Material," pages 127-134, 1970. Talc (a magnesium silicate) and magnesium oxide are common additives.

There is a need for sintering aids which will make high alumina ceramics compatible with (cofireable with) palladium metallizations to produce substrates exhibiting high thermal conductivity, mechanical strength and surface smoothness.

SUMMARY OF THE INVENTION

This invention provides an alumina sintering or densification aid useful in dielectric compositions which may be sintered at or below 1,500°C. and, hence, may be cofired with palladium metallizations. The sintering aid is a glass frit of the composition set forth in Table I, which sets forth both operable and preferred composition ranges.

TABLE I

GLASS SINTERING AID FOR ALUMINA

| Component | Weight Percentage | |
|---|---|---|
| | Operable Range | Preferred Range |
| $SiO_2$ | 30-50 | 40-50 |
| $Al_2O_3$ | 5-20 | 5-12 |
| Alkaline Earth Oxides | 14-26 | 14-26 |
| $TiO_2$ | 1-15 | 5-12 |
| $ZnO_2$ | 1-10 | 2-8 |
| PbO | 1-10 | 2-8 |

This invention also provides dielectric compositions consisting essentially of, by weight, 75-97 percent alumina and 3-25 percent of said glass frit; preferably, 91-97 percent alumina and 3-9 percent of frit. It is preferred that the particles in said composition have an average diameter in the range 1-5 microns, with substantially no particles larger than 10 microns in diameter.

This invention also provides ceramic articles comprising dielectric substrates having low dielectric constants, which are prepared by firing the aforesaid dielectric compositions (previously cast into flexible sheets with binders) in air at temperatures of 1,500°C. or below, usually 1,450°-1,500°C. The fired substrates, employed with both buried and top surface palladium metallizations, are dense ceramics which exhibit very smooth surface finish, high mechanical strength, and low dielectric loss.

DETAILED DESCRIPTION

The sintering (or densification) aids of the present invention are glass frits which are added to alumina to help densify alumina at temperatures below the melting point of palladium metallizations, thus permitting cofiring of the metallized substrates at temperatures below the melting point of palladium, and usually in the range 1,450°-1,500°C. The sintering aid causes the substrate to coalesce into a nonporous structure and, thus, produce a dense substrate.

The glass frit is of the composition set forth in Table I and is prepared from the prescribed amounts of the respective oxides or precursors of the oxides [e.g., $Al_2O_3$ may be supplied to the batch as $Al(OH)_3$] by conventional techniques of melting the oxides and/or oxide precursors to a clear mass and then pouring the molten mass into cold water, following by ball milling of the frit to the desired particle size.

By the term "alkaline earth oxides," one or more of which may be present in the sintering aids of the present invention so long as the total weight percent thereof in the sintering aid is in the range 14-26 percent, is meant the oxides of Ca, Mg, Sr and Ba.

The sintering aid of the present invention is normally ground with alumina to prepare a dielectric composition with particles having an average particle diameter in the range 1-5 microns, preferably 1-3 microns, in any case with substantially no particles larger than 10 microns in diameter.

The dielectric compositions of the present invention consist essentially of 75-97 percent of alumina and 3-25 percent of the above-described glass sintering aid (by weight). Especially useful high alumina dielectric compositions consist essentially of 91-97 percent alumina and 3-9 percent sintering aid. The alumina, prior to use, must be in finely divided form, that is, the average particle diameter of the alumina is 1-5 microns, preferably 1-3 microns, substantially no particles having a diameter greater than 10 microns. Reynolds RC-152 DBM alumina is a preferred alumina, having an average particle diameter of about 1.6 microns. Another operable alumina is Reynolds RC-122, having an average particle diameter of about 5 microns. It is, therefore, clear that submicron sized reactive alumina powders, difficult to use in binder systems, are not employed in the dielectric compositions of the present invention.

Normally, the desired amounts of alumina and a given sintering aid are ball milled together with suitable wetting agents and dispersing aids, such as trisodium polyphosphate, methyl cellulose or one of the Rohm and Haas "Tamol" dispersing agent series.

Ceramic articles may be made from the dielectric compositions of the present invention by various methods, including that of Park U.S. Pat. No. 2,966,719. Preferably, the sintering aid and alumina in finely divided form are thoroughly mixed with a binder system to form a slurry and the slurry mixture is deposited on a smooth carrier surface (for example, polyethylene-coated Du Pont Mylar[R] polyester film) as a sheet or tape by any conventional coating and/or extrusion technique such as doctor blading, casting, etc. Then the article is dried by any conventional drying procedure, e.g., infrared, air-dry, oven heat. Drying may be accelerated by heating to a temperature in the range 50°-150°C.

The binder system employed may be based on a volatile organic liquid or water, preferably upon water. A preferred binder system is the water-based resin system claimed in copending application S.N. 850,617, filed Aug. 15, 1969, now abandoned. The resultant dry, flexible tape or sheet is stripped from the carrier surface and punched or cut to the desired sheet dimensions.

Usually the unsintered cut sheets will be used to make multilayer monolithic internally metallized structures. Thus, the sheets are further processed to provide via holes which, when filled with metallization and fired, will provide electrical continuity between the various layers. The sheets are then metallized as required, and the via holes are filled with metallization. The sheets are then laminated under heat and/or pressure, and the laminate is then fired to burn out binder (e.g., it is heated from room temperature to 600°C. in 4 hours), and then sintered in air at 1,450-1,500°C. The duration of the heating process is sufficient to form nonporous articles, and is normally in the range 1 to 4 hours. Often about 2 hours is required to densify the article to greater than 95 percent of the theoretical density and and, thus, achieve the desired electrical, mechanical and thermal properties. As desired, exposed (top surface) metallizations can be post-fired or cofired with the laminate.

The mechanism by which the glass sintering aids of the present invention densify alumina during firing has not been conclusively studied. However, it is thought that sintering takes place by a liquid-phase mechanism. The glass compositions of this invention are molten at 1,500°C. and remain liquid as dissolution of non-fritted alumina particles occurs during sintering. Thus, the alumina content of the glass phase rises during sintering and causes formation, upon cooling, of a coalesced densified structure of alumina particles in a glassy matrix. Assuming that this mechanism is correct, it is seen that it is important that the glass densification aid melt at or below 1,500°C.

Examples and Comparative Showings

This invention is illustrated by the following examples (designated by Roman numerals), and is contrasted with inoperative compositions (designated by capital letters). In the following experiments and elsewhere in this specification and the appended claims, all parts, ratios and percentages of materials or components are by weight.

Fired substrates were examined for "open porosity" visually by a dye absorption technique using Magnaflux Corp. "Zyglo" dye as the penetrant. The fired substrate was immersed in the penetrant for 15 minutes, then rinsed in cold running water for 10 minutes to remove excess dye. The substrates were then inspected under U.V. light for indications of dye penetration.

Apparent density, surface smoothness, flexural strength, electrical dissipation factor and volume resistivity of buried palladium metallizations were each determined, but only on those fired examples passing the above-described qualitative test for open porosity.

Apparent density was determined according to the Archimedes method using water or methanol. Surface smoothness was studied using a Model 150 Selvite Bush Surface Analyzer to determine surface profile traces. Flexural strength was determined according to ASTM D790. Dissipation factors were measured at 1 KHz.; volume resistivities of the buried palladium metallizations were determined from the resistance and cross-sectional area of a known length of buried metallization.

The glass frits of Table II were prepared as follows. The oxides were weighed out and mixed, except that $Al_2O_3$ was supplied to the batch as $Al(OH)_3$. The mixture was melted at the temperature indicated in Table II in a kyanite crucible to form a clear homogeneous melt; the molten glass was poured into cold, running water to form a frit; then the frit was ground in a ball mill jar equipped with the normal complement (half full) of grinding medium (ceramic balls) and the proper weight of water until less than 1 percent residue was retained on a 400-mesh sieve (U.S. standard scale).

The respective amounts of the glass frit and $Al_2O_3$ (Reynolds RC-122 alumina or RC-152 alumina, as prescribed in Table III) indicated in Table III for the respective examples and comparative showings, totaling 300 g., were placed in a one quart borundum (85 percent $Al_2O_3$, 12 percent $SiO_2$, 2 percent MgO and 1 percent CaO) ball mill jar half filled with 3/16-inch borundum grinding media. To the jar was added 120 g. of a 1 percent aqueous solution of Methocel (methyl cellulose grade 90, Dow Chemical Company) and 0.5 g. of trisodium polyphosphate wetting agent. The mixture was milled for 16 hours and the resultant slurry was de-aerated under vacuum using 1 or 2 drops of octyl alcohol to break up any foam.

Binder was added to the slurry as follows: 150 g. of slurry was stirred during the slow addition thereto of 29 g. of Rohm and Haas HA-12 binder (an acrylic ester) and 5 drops of 25 percent aqueous solution of Rohm and Haas Tamol SN.

The resultant slurry was then cast on polyethylene-coated Mylar" polyester sheets as 22-mil thick tapes and air dried. From the resultant dry, flexible unfired tape were punched 1.2-inch squares. The squares were metallized with palladium by a thick film technique by printing a 124 square pattern through a 200-mesh screen (U.S. sieve scale), then laminated in a steel die at 5,000-25,000 p.s.i. The laminated body was then fired in air at 600°C. for 4 hours to burn off organic materials, then densified at a firing temperature in the range 1,450°-1,500°C. (as indicated in Table III) for 2 hours.

Open porosity was not observed with the fired examples of invention (Runs I-IV), but was observed with comparative showings A-E. Further characterization of the examples of the invention is recorded in Table III.

I claim:

1. A dielectric composition for preparing low dielectric constant alumina ceramic substrates which composition is cofireable with palladium metallizations, said composition consisting essentially of, by weight, 75-97 percent alumina and 3-25 percent of a glass frit as an alumina sintering aid, said glass frit consisting essentially of, 30-50 percent $SiO_2$
5-20 percent $Al_2O_3$
14-26 percent One or more alkaline earth oxides
1-15 percent $TiO_2$
1-10 percent ZnO
1-10 percent PbO 2. A dielectric composition according to claim 1 wherein the glass frit consists essentially of, by weight, 40-50 percent $SiO_2$
5-12 percent $Al_2O_3$
14-26 percent One or more alkaline earth oxides
5-12 percent $TiO_2$
2-8 percent ZnO
2-8 percent PbO 3. A dielectric composition according to claim 1 consisting essentially of, by weight, 91-97 percent alumina and 3-9 percent of said glass frit.

TABLE II

BATCH COMPONENTS OF GLASS SINTERING AIDS (WT. %)

| Component | Glass No. | | | | | | |
|---|---|---|---|---|---|---|---|
| | (1) | (2) | (a) | (b) | (c) | (d) | (e) |
| $SiO_2$ | 45 | 50 | 50 | 45 | 45 | 45 | 54 |
| MgO | 15 | 10 | 30 | 12 | 20 | 20 | 8 |
| CaO | 10 | 10 | – | – | 15 | 20 | 8 |
| $Al_2O_3$ | 10 | 10 | 5 | 25 | 10 | 5 | 20 |
| $TiO_2$ | 10 | 10 | 10 | 10 | 10 | 10 | – |
| ZnO | 5 | 5 | 5 | 8 | – | – | – |
| PbO | 5 | 5 | – | – | – | – | 10 |
| Melting Temp. (°C.) | 1500 | 1550 | 1500 | 1450 | 1500 | 1500 | 1550 |

TABLE III

COMPOSITIONS AND PROPERTIES OF ALUMINA SUBSTRATES

| | Examples of Invention | | | | Comparative Showings | | | | |
|---|---|---|---|---|---|---|---|---|---|
| | I | II | III | IV | A | B | C | D | E |
| Unfritted $Al_2O_3$ (g.) | 273 | 288 | 280 | 255 | 270 | 270 | 270 | 270 | 282 |
| RC Type Glass | 152 | 152 | 152 | 152 | 122 | 122 | 122 | 122 | 152 |
| No. | (1) | (1) | (2) | (1) | (a) | (b) | (c) | (d) | (e) |
| Wt. (g.) | 27 | 12 | 20 | 45 | 30 | 30 | 30 | 30 | 18 |
| Wt. % Glass in Total Glass Plus Unfritted $Al_2O_3$ | 9 | 4 | 6.3 | 85 | 10 | 10 | 10 | 10 | 6 |
| Total $Al_2O_3$ in $Al_2O_3$/ Glass Mixture (Wt. %) | 91.8 | 96.4 | 94.0 | 86.5 | 90.5 | 92.4 | 91.0 | 90.5 | 95.2 |
| Firing Temp. (°C.) | 1440 | 1500 | 1500 | 1500 | 1500 | 1500 | 1500 | 1500 | 1500 |
| Open Porosity | No | No | No | No | Yes | Yes | Yes | Yes | Yes |
| Apparent Density (g./cc.) | 3.66 | 3.71 | 3.69 | – | – | – | – | – | – |
| Flexural Strength (p.s.i.) | 60,000 | 50,000 | 50,000 | – | – | – | – | – | – |
| Surface Smoothness (microinches, center line average) | 6 | 20 | 21 | 15 | – | – | – | – | – |
| Dissipation Factor (absolute) | .0005 | .0005 | .0006 | – | – | – | – | – | – |
| Volume Resistivity of Buried Pd ($\mu$-ohm. cm.) | 15 | 15 | 15 | – | – | – | – | – | – |

4. A dielectric composition according to claim 3 wherein the glass frit consists essentially of, by weight, 40–50 percent $SiO_2$
5–12 percent $Al_2O_3$
14–26 percent One or more alkaline earth oxides
5–12 percent $TiO_2$
2–8 percent ZnO
2–8 percent PbO

5. A dielectric composition according to claim 4 having particles with an average diameter in the range 1–5 microns, with substantially no particles being larger than 10 microns in diameter.

6. A dielectric composition according to claim 5 wherein the average particle diameter is in the range 1–3 microns.

7. A dielectric composition according to claim 1 having particles with an average diameter in the range 1–5 microns, with substantially no particles being larger than 10 microns in diameter.

8. A dielectric composition according to claim 7 wherein the average particle diameter is in the range 1–3 microns.

9. A ceramic article comprising a substrate consisting essentially of the sintered composition of claim 1.

10. A ceramic article comprising a substrate consisting essentially of the sintered composition of claim 2.

11. A ceramic article comprising a substrate consisting essentially of the sintered composition of claim 3.

* * * * *